US012775931B2

(12) United States Patent
Fishman et al.

(10) Patent No.: US 12,775,931 B2
(45) Date of Patent: Oct. 27, 2026

(54) SELECTIVE UNLOCKING OF A PHYSICAL CARD TO RESTRICT UNAUTHORIZED ACCESS

(71) Applicant: Capital One Services, LLC, McLean, VA (US)

(72) Inventors: Jacob Fishman, McLean, VA (US); Anthony Calderaro, Vienna, VA (US); Sriram Kiran Tanikella, Ashburn, VA (US); Gaurav Ramesh Dixit, Vienna, VA (US); Nancy Che, New York, NY (US); Karly Brusie, Woodbridge, VA (US); Brady Olson, Portland, OR (US); Cody Hornberger, Woodbridge, VA (US); Collin Fingar, Wood Ridge, NJ (US)

(73) Assignee: Capital One Services, LLC, McLean, VA (US)

( * ) Notice: Subject to any disclaimer, the term of this patent is extended or adjusted under 35 U.S.C. 154(b) by 8 days.

(21) Appl. No.: 18/601,161

(22) Filed: Mar. 11, 2024

(65) Prior Publication Data

US 2025/0285103 A1 Sep. 11, 2025

(51) Int. Cl.
*G06Q 20/34* (2012.01)
*G06Q 20/40* (2012.01)

(52) U.S. Cl.
CPC .................................. *G06Q 20/354* (2013.01)

(58) Field of Classification Search
CPC .................................................... G06Q 20/354
USPC ............................................................ 705/41
See application file for complete search history.

(56) References Cited

U.S. PATENT DOCUMENTS

| | | | | |
|---|---|---|---|---|
| 6,095,416 | A * | 8/2000 | Grant | G07F 7/1008 235/492 |
| 10,489,789 | B1 | 11/2019 | Gerling-Ospina et al. | |
| 12,243,398 | B2 * | 3/2025 | Omojola | G06Q 20/10 |
| 2001/0047330 | A1 * | 11/2001 | Gephart | G06Q 30/0601 705/26.1 |

(Continued)

FOREIGN PATENT DOCUMENTS

WO 2010147559 A1 12/2010

OTHER PUBLICATIONS

"What is card lock and how does it work?" retrieved at https://www.capitalone.com/learn-grow/money-management/card-lock/; Aug. 17, 2023; 3 pages.

*Primary Examiner* — Clifford B Madamba
(74) *Attorney, Agent, or Firm* — Harrity & Harrity, LLP

(57) ABSTRACT

In some implementations, a device may receive, from a user device, a request to activate a physical card. The request may indicate information relating to the physical card and request-specific data. The device may activate the physical card in response to the request. The device may monitor, while the physical card is activated, for an expiration of an activation time duration. The activation time duration may be according to the request-specific data. The device may detect that a deactivation condition for deactivating the physical card is satisfied. The deactivation condition may be the expiration of the activation time duration or an occurrence of an exchange involving the physical card. The device may deactivate the physical card in response to satisfaction of the deactivation condition and without involvement of the user device.

20 Claims, 8 Drawing Sheets

(56) References Cited

U.S. PATENT DOCUMENTS

| | | | | |
|---|---|---|---|---|
| 2010/0155470 | A1* | 6/2010 | Woronec | G07F 7/08 235/380 |
| 2013/0046692 | A1* | 2/2013 | Grigg | G06Q 40/00 705/44 |
| 2013/0091060 | A1* | 4/2013 | Kundu | G06Q 20/354 705/44 |
| 2024/0152594 | A1* | 5/2024 | Talwar | G06F 21/34 |

* cited by examiner

SELECTIVE UNLOCKING OF A PHYSICAL CARD TO RESTRICT UNAUTHORIZED ACCESS

BACKGROUND

An exchange involving a physical card may be performed by providing an input of information relating to the physical card to an exchange device. The exchange device may transmit a request indicating the information, or information derived therefrom, to a backend system. The backend system may validate the information, and based on validating the information, may transmit a response to the exchange device indicating whether the exchange is approved or declined.

SUMMARY

Some implementations described herein relate to a system for selective unlocking of a physical card. The system may include one or more memories and one or more processors communicatively coupled to the one or more memories. The one or more processors may be configured to receive, from a user device (e.g., a mobile device), a request to activate a physical card, where the request indicates location data associated with the user device. The one or more processors may be configured to determine, based on the location data, an activation time duration for the physical card. The one or more processors may be configured to activate the physical card in response to the request, where activating the physical card allows use of the physical card in exchanges (e.g., transactions). The one or more processors may be configured to monitor, while the physical card is activated, for an expiration of the activation time duration. The one or more processors may be configured to deactivate, automatically in response to the expiration of the activation time duration, the physical card, where deactivating the physical card prevents use of the physical card in exchanges.

Some implementations described herein relate to a method of selective unlocking of a physical card. The method may include receiving, by a device and from a user device (e.g., a mobile device), a request to activate a physical card, where the request indicates information relating to the physical card and request-specific data. The method may include activating, by the device, the physical card in response to the request, where activating the physical card allows use of the physical card in exchanges. The method may include monitoring, while the physical card is activated, for an expiration of an activation time duration, where the activation time duration is according to the request-specific data. The method may include detecting, by the device, that a deactivation condition for deactivating the physical card is satisfied, where the deactivation condition is the expiration of the activation time duration or an occurrence of an exchange involving the physical card. The method may include deactivating, by the device, the physical card in response to satisfaction of the deactivation condition and without involvement of the user device, where deactivating the physical card prevents use of the physical card in exchanges.

Some implementations described herein relate to a non-transitory computer-readable medium that stores a set of instructions for selective unlocking of a physical card. The set of instructions, when executed by one or more processors of a device, may cause the device to receive, from a user device (e.g., a mobile device), a request to activate a physical card, where the request indicates an activation time duration. The set of instructions, when executed by one or more processors of the device, may cause the device to activate the physical card in response to the request, where activating the physical card allows use of the physical card in exchanges. The set of instructions, when executed by one or more processors of the device, may cause the device to monitor, while the physical card is activated, for an expiration of the activation time duration. The set of instructions, when executed by one or more processors of the device, may cause the device to deactivate, automatically in response to the expiration of the activation time duration, the physical card, where deactivating the physical card prevents use of the physical card in exchanges.

DETAILED DESCRIPTION

Figure 1A:
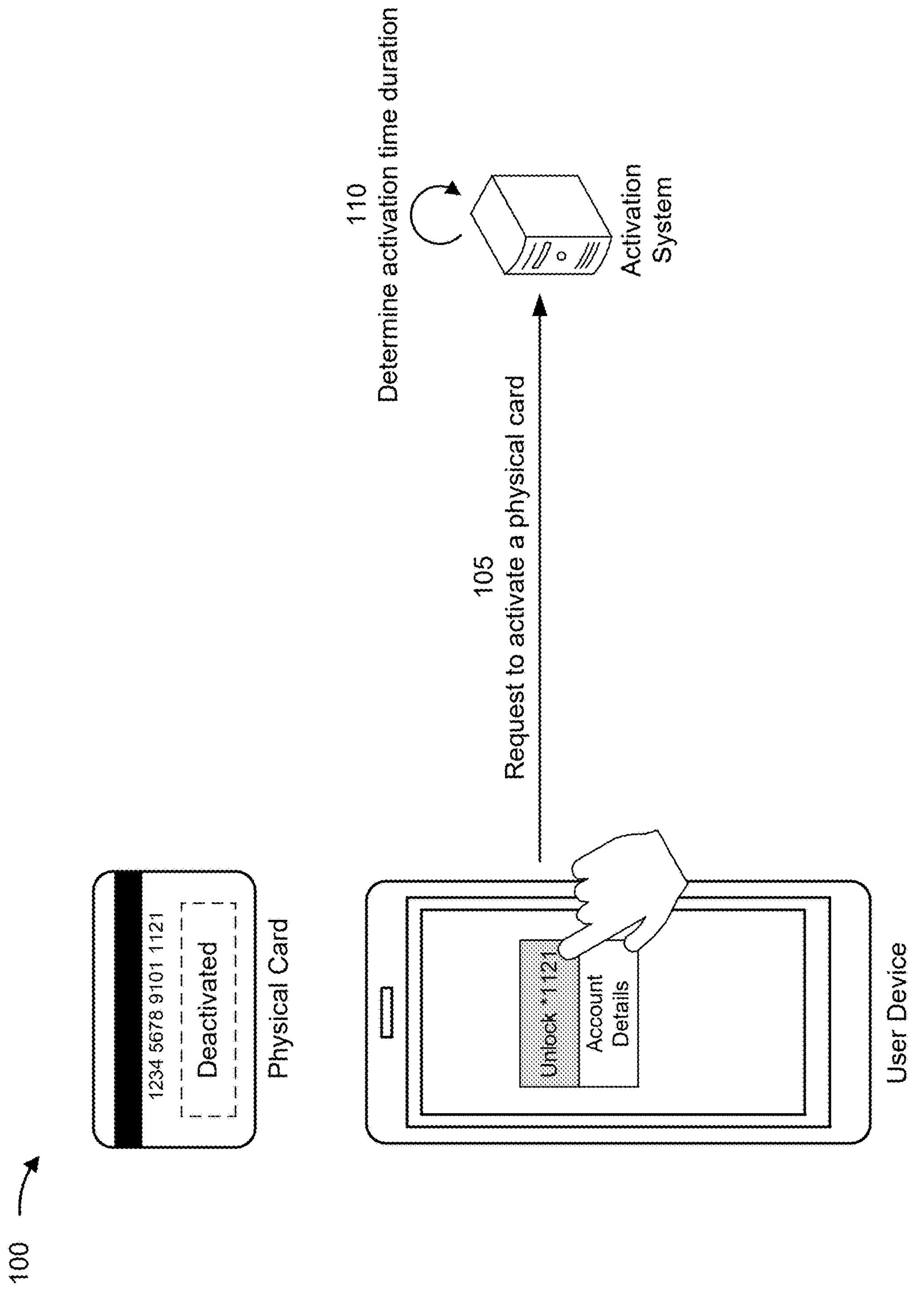
FIGS. 1A-1E are diagrams of an example associated with selective unlocking of a physical card to restrict unauthorized access, in accordance with some embodiments of the present disclosure.

The following detailed description of example implementations refers to the accompanying drawings. The same reference numbers in different drawings may identify the same or similar elements.

In connection with an exchange involving a physical card (e.g., a transaction card, such as a credit card or a debit card), an exchange device (e.g., a point-of-sale terminal) may send information relating to the physical card to a backend system, and the backend system may process the information to identify whether to approve the exchange. In general, a physical card may be susceptible to fraudulent activity, and an entity (e.g., an issuer of the physical card) may expend significant computing resources (e.g., processor resources and/or memory resources) toward identifying fraudulent charges, investigating fraudulent charges, blocking fraudulent charges, correcting fraudulent charges, or the like.

One security feature that may be used for a physical card allows the physical card to be locked, thereby preventing exchanges involving the physical card while the physical card is locked. When an exchange involving the physical card is attempted while the physical card is locked, the backend system will decline the exchange. However, computing resources and/or network resources associated with communications between the exchange device and the backend system to process the exchange are expended even though the exchange will eventually be declined.

Furthermore, in some examples, a user associated with the physical card may be allowed to request toggling of the physical card between locked and unlocked, whereby each toggling of the physical card involves communications between the user's device and the backend system that expends computing resources and/or network resources. Because toggling the physical card between locked and unlocked is controlled by the user, an amount of time that the physical card is unlocked may be imprecise. For example, the amount of time that the physical card is unlocked may be too short, thereby leading to declined exchanges, or too long, thereby diminishing the security to the physical card provided by locking. Moreover, following a use of the physical card, the user may fail to toggle the physical card back to being locked due to user error and/or inattentiveness. In addition, because toggling the physical card back to being locked relies on communications from the user's device reaching the backend system, intermittent connectivity or signal loss of the user's device may prevent locking of the physical card following use.

Some implementations described herein enable selective unlocking of a physical card with automatic re-locking of the physical card. In some implementations, following unlocking of the physical card in accordance with a user request, a system may automatically lock the physical card in accordance with a time duration. In some implementations, the system may determine the time duration according to location data associated with a user device that sent the request to unlock the physical card. Accordingly, the time duration may be highly accurate, thereby improving the security of the physical card. Furthermore, due to the high accuracy of the time duration, the probability that an exchange will be attempted after expiration of the activation time duration is reduced, thereby conserving computing resources and/or network resources that otherwise would be used to process and decline such an exchange. Moreover, by automatically re-locking the physical card (e.g., without involvement of the user device) computing resources and/or network resources that otherwise may have been used for communicating an additional deactivation request between the user device and the system are conserved. In addition, automatically re-locking the physical card, rather than user-initiated re-locking, provides a failsafe mechanism for restoring the physical card to a secure state that is resilient to user error, inattentiveness, and/or the user's device experiencing intermittent connectivity or signal loss.

FIGS. 1A-1E are diagrams of an example 100 associated with selective unlocking of a physical card to restrict unauthorized access. As shown in FIGS. 1A-1E, example 100 includes an activation system, a user device, and an exchange device. These devices are described in more detail in connection with FIGS. 2-3.

The user device may be associated with a user that has been issued a physical card by an entity (e.g., a financial institution). The physical card may include a transaction card (e.g., a credit card, a debit card, a gift card, an automated teller machine (ATM) card, a rewards card, or a client loyalty card, among other examples), an identification card, or the like. The activation system may be associated with the entity that issued the physical card to the user. For example, the activation system may be configured to validate physical cards and/or process exchanges (e.g., transactions) involving physical cards. The exchange device may be associated with a third-party entity (e.g., a merchant) with whom the user is attempting to perform an exchange. For example, the exchange device may be configured to obtain information relating to the physical card, and to transmit the information to the activation system for validation.

The physical card may be kept deactivated unless activation of the physical card is specifically requested. In some implementations, the activation system may maintain a status indicator for the physical card (e.g., in a record relating to the physical card). Accordingly, the status indicator may have a deactivated status (e.g., by default), which can be updated to an activated status from time to time. The deactivated status may indicate that the physical card is deactivated (which can also be referred to as "locked") from use in exchanges (e.g., an exchange involving the physical card would be declined when the status indicator indicates the deactivated status). The activated status may indicate that the physical card is activated (which can also be referred to as "unlocked") for use in exchanges (e.g., an exchange involving the physical card would be approved when the status indicator indicates the activated status, provided that other conditions for approval of the exchange are satisfied).

Prior to the operations of example 100, the physical card may be deactivated by default. As shown in FIG. 1A, and by reference number 105, the activation system may receive, from the user device, a request to activate the physical card. The user device may transmit the request in response to a user input made to the user device indicating that the physical card is to be activated. In some implementations, the user input may be made via an application of the user device, such as a smartphone widget, a mobile application (or "app"), a quick action menu of an app, or the like. The application may have a streamlined user interface that allows the user to initiate the request with a single interaction (which can be referred to as "one touch" or "one tap"). In some implementations, the user device may block access to the user interface and/or deactivate the user interface if the user has not been authenticated to access the user device (e.g., using a biometric and/or a passcode to unlock the user device).

The request may indicate information relating to the physical card, such as an identifier associated with the physical card (e.g., an account number, an identification number, a security code, or the like). In some implementations, the request may indicate one or more allowable channels for the physical card. An allowable channel may include an allowable category (e.g., groceries, clothing, pharmacy, or the like) or an allowable entity (e.g., "Jane's Boutique"). The one or more allowable channels may be selected by the user (e.g., different requests to activate the physical card may indicate different allowable channels). The request indicating the one or more allowable channels indicates that exchanges falling in the one or more allowable channels can be approved, while exchanges falling outside of the one or more allowable channels are to be declined.

In some implementations, the request may indicate an allowable amount for the physical card. The allowable amount may be selected by the user (e.g., different requests to activate the physical card may indicate different allowable amounts). The request indicating the allowable amount indicates that exchanges that would not result in exceeding the allowable amount (e.g., the sum of the amounts associated with exchanges occurring while the physical card is activated would not exceed the allowable amount) can be approved, while exchanges that would result in exceeding the allowable amount (e.g., the sum of the amounts associated with exchanges occurring while the physical card is activated would exceed the allowable amount) are to be declined.

In some implementations, the request may indicate request-specific data. "Request-specific data" refers to data that can be changed for different requests (e.g., whereas the information relating to the physical card is to be the same for different requests). In some implementations, the request-specific data indicates an activation time duration, which may indicate an amount of time for which the physical card is to remain activated upon activation of the physical card. The activation time duration may be an amount of time selected (e.g., configured) by the user (e.g., different requests to activate the physical card may indicate different activation time durations) or may be based on a default value. In some implementations, the request-specific data may indicate location data associated with the user device. For example, the location data may indicate a current location (e.g., geographic coordinates) of the user device and/or a time series of locations of the user device over a particular previous time period.

As shown by reference number 110, the activation system may determine an activation time duration for the physical card (e.g., if the request-specific data does not directly indicate the activation time duration). For example, the activation system may determine the activation time duration based on the location data. In some implementations, to determine the activation time duration, the activation system may determine, based on the location data, a location type of a location of the user device. For example, the activation system may cross-reference the location (e.g., geographic coordinates) with map data, a business directory, a residential directory, or the like, to determine the location type of the location. The location type may be a residence, a shopping mall, a supermarket, a clothing store, or the like. Additionally, or alternatively, to determine the activation time duration, the activation system may determine, based on the location data, a mobility level of the user data. For example, the mobility level may indicate whether the user device is remaining in the same place, moving infrequently, moving frequently, or the like. The mobility level may be a mobility score, a mobility classification, or the like. In some implementations, the activation system may determine the mobility level using a machine learning model trained to output the mobility level (e.g., a mobility score or a mobility classification) from an input of the location data.

The activation system may determine the activation time duration according to the location type and/or the mobility level. For example, a particular location type and/or mobility level may indicate a probability of the user engaging in a particular exchange behavior. As an example, a residential location type and/or a non-moving mobility level may indicate an online shopping scenario, which may indicate that an exchange is to be performed relatively quickly after the request to activate the physical card. As another example, a shopping mall location type and/or a frequently-moving mobility level may indicate an in-person shopping scenario with high-density store locations, which may indicate that one or more exchanges are to be performed over a relatively longer period of time after the request to activate the physical card.

In some implementations, the activation system may determine the activation time duration according to the location type and/or the mobility level based on historical exchange data for the physical card (and/or for one or more other physical cards). For example, the historical exchange data may indicate a plurality of previous exchanges involving the physical card, including data indicating times associated with the previous exchanges, locations associated with the previous exchanges, and/or merchant categories associated with the previous exchanges. In some implementations, the activation system may use the historical exchange data in conjunction with historical activation request data for the physical card (and/or for one or more other physical cards). The historical activation request data may indicate a plurality of previous activation requests involving the physical card, including location data for the previous activation requests and/or times associated with the previous activation requests.

As an example, the historical exchange data and/or the historical activation request data may indicate a timing relationship between a timing of an activation request and a timing of one or more subsequent exchanges, with respect to a location type and/or a mobility level. Furthermore, the historical exchange data and/or the historical activation request data may indicate a quantity of exchanges that typically follow an activation request, with respect to a location type and/or a mobility level. Accordingly, the activation system may determine the activation time duration, with respect to the location type and/or the mobility level, in accordance with an identified timing relationship and/or an identified quantity of exchanges. In some implementations, the activation system may determine the activation time duration and/or a quantity of exchanges using a machine learning model trained (e.g., using the historical exchange data and/or the historical activation request data) to output the activation time duration from an input of the location type, the mobility level, and/or the location data. Accordingly, the activation time duration determined by the activation system may be highly accurate, thereby improving the security of the physical card and reducing the probability that an exchange will be attempted after expiration of the activation time duration (e.g., which consumes computing resources and/or network resources to process such an exchange).

Figure 1B:
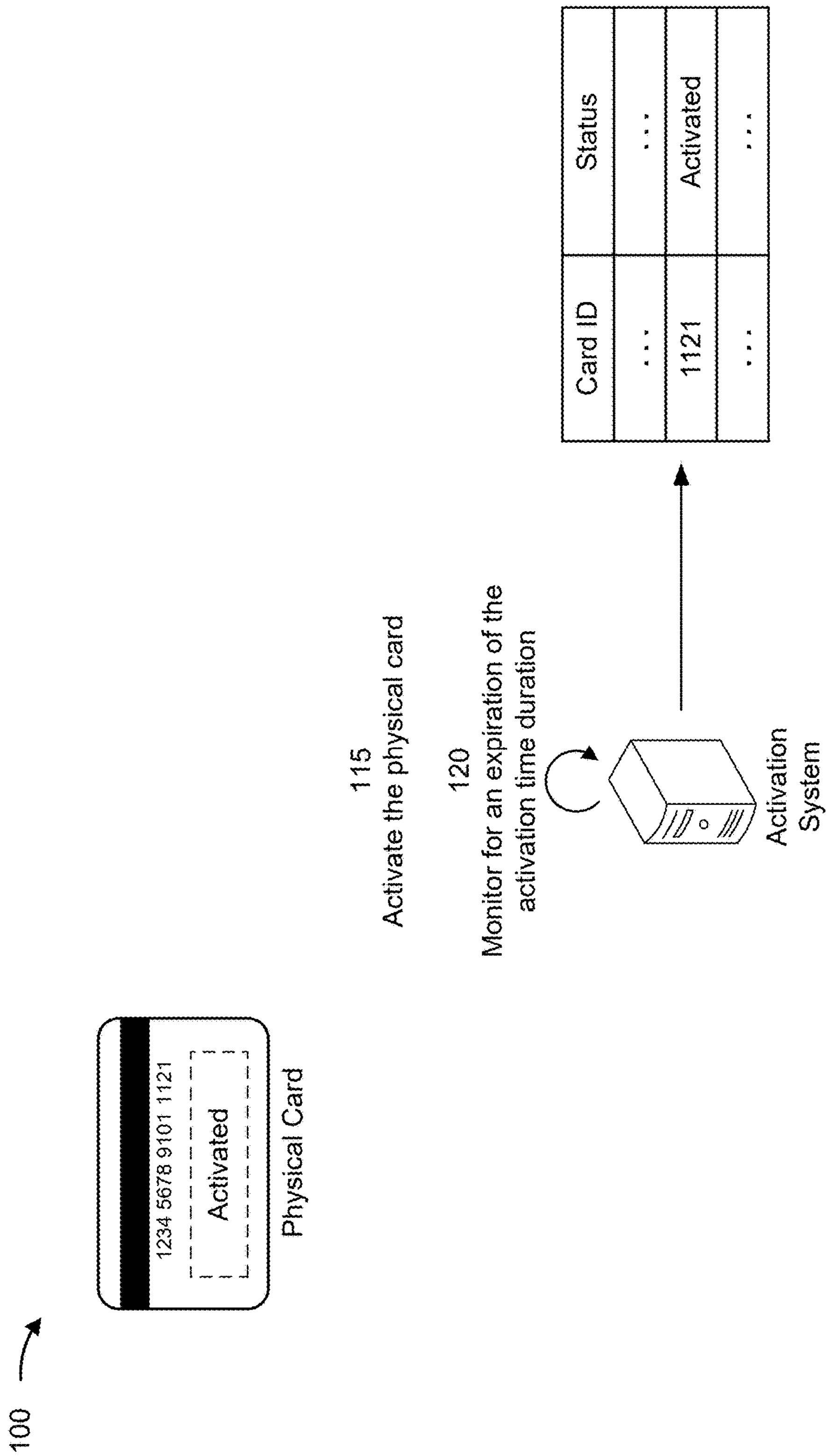

As shown in FIG. 1B, and by reference number 115, the activation system may activate the physical card in response to the request. For example, activating the physical card may allow use of the physical card in exchanges. In other words, while the physical card is activated, an attempt to use the physical card in an exchange will be approved, provided that other conditions for approval of the exchange are satisfied (e.g., an amount of the exchange does not exceed a credit limit associated with the physical card, or a location and/or an amount of the exchange is not indicative of fraud, among other examples). In some implementations, to activate the physical card, the activation system may update the status indicator for the physical card from the default deactivated status to the activated status. For example, the activation system may generate and execute a database query that updates (e.g., in a database) the status indicator for the physical card from the default deactivated status to the activated status.

As shown by reference number 120, the activation system may monitor for an expiration of the activation time duration while the physical card is activated. In some implementations, to monitor for the expiration of the activation time duration, the activation system may compute an activation time for the physical card in accordance with the activation time duration (e.g., by adding the activation time duration to a current timestamp, thereby resulting in a future time). The activation system then may store information indicating the activation time (e.g., in a database). Furthermore, the activation system may periodically compare the activation time to a current time (e.g., by executing a database query configured to return records indicating an activation time that is no later than the current time), where the expiration of the activation time duration may be indicated when the current time is greater than or equal to the activation time. The activation system may initiate monitoring for the expiration of the activation time duration upon (e.g., after) activating the physical card (e.g., upon updating the status indicator for the physical card from the default deactivated status to the activated status).

Figure 1C:
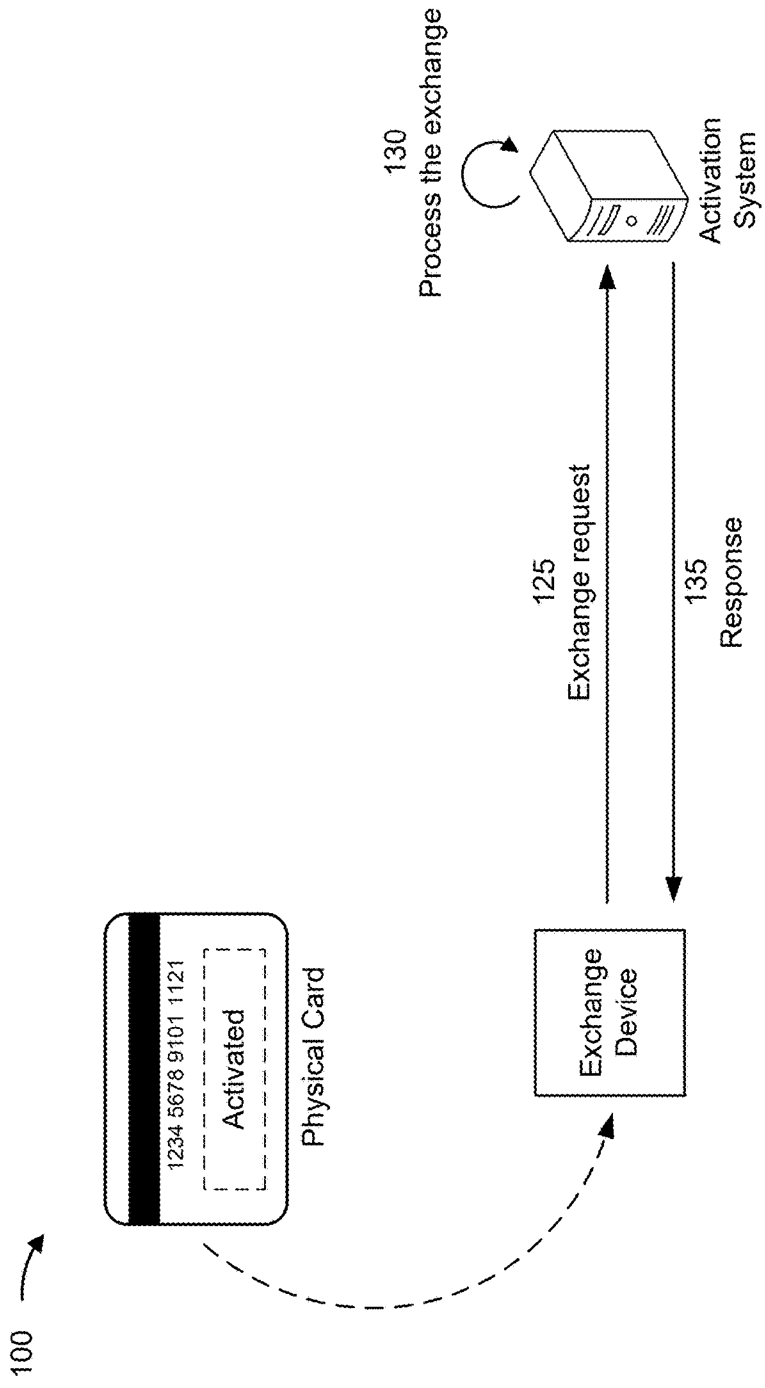

As shown in FIG. 1C, and by reference number 125, while the physical card is activated, the activation system may receive an exchange request from the exchange device. The exchange request may relate to an exchange (e.g., a transaction) involving the physical card (e.g., between the user and the entity associated with the exchange device). The exchange request may indicate an identifier for the physical card, an expiration date for the physical card, a security code for the physical card, an amount of the exchange, or the like. In some implementations, the exchange request may indicate a channel for the exchange. For example, the channel may indicate a category (e.g., a classification of the goods and/or services involved in the exchange) and/or an entity (e.g., a merchant involved in the exchange). The exchange device may have obtained the identifier for the physical card from the user device (e.g., the user device may have provided the identifier to the exchange device in connection with an online payment) or from the physical card (e.g., the physical card may have been swiped or tapped at the exchange device). In some implementations, in response to receiving the request, the activation system may retrieve the status indicator for the physical card, and may use the status indicator to identify whether the physical card is activated or deactivated.

As shown by reference number 130, the activation system may process the exchange. In accordance with the physical card being activated, processing the exchange may include approving the exchange (e.g., provided that other conditions for approval of the exchange are satisfied). In some implementations, the exchange may be declined, even when the physical card is activated, in accordance with the channel for the exchange differing from the one or more allowable channels (e.g., the exchange may be declined if the channel does not correspond to one of the allowable channels) and/or the amount of the exchange, alone or in combination with amounts of one or more additional exchanges (e.g., additional exchanges made using the physical card and occurring after activation of the physical card), exceeding the allowable amount. Otherwise, if the channel corresponds to one of the allowable channels and/or if the allowable amount would not be exceeded, then the exchange may be approved, in accordance with the physical card being activated. In some implementations, to process the exchange, the activation system may post a charge to an account associated with the physical card, may debit funds from the account, may transfer funds from the account to another account, or the like. As shown by reference number 135, the activation system may transmit a response to the exchange request to the exchange device. The response may indicate that the exchange is approved or declined, as described above.

Figure 1D:
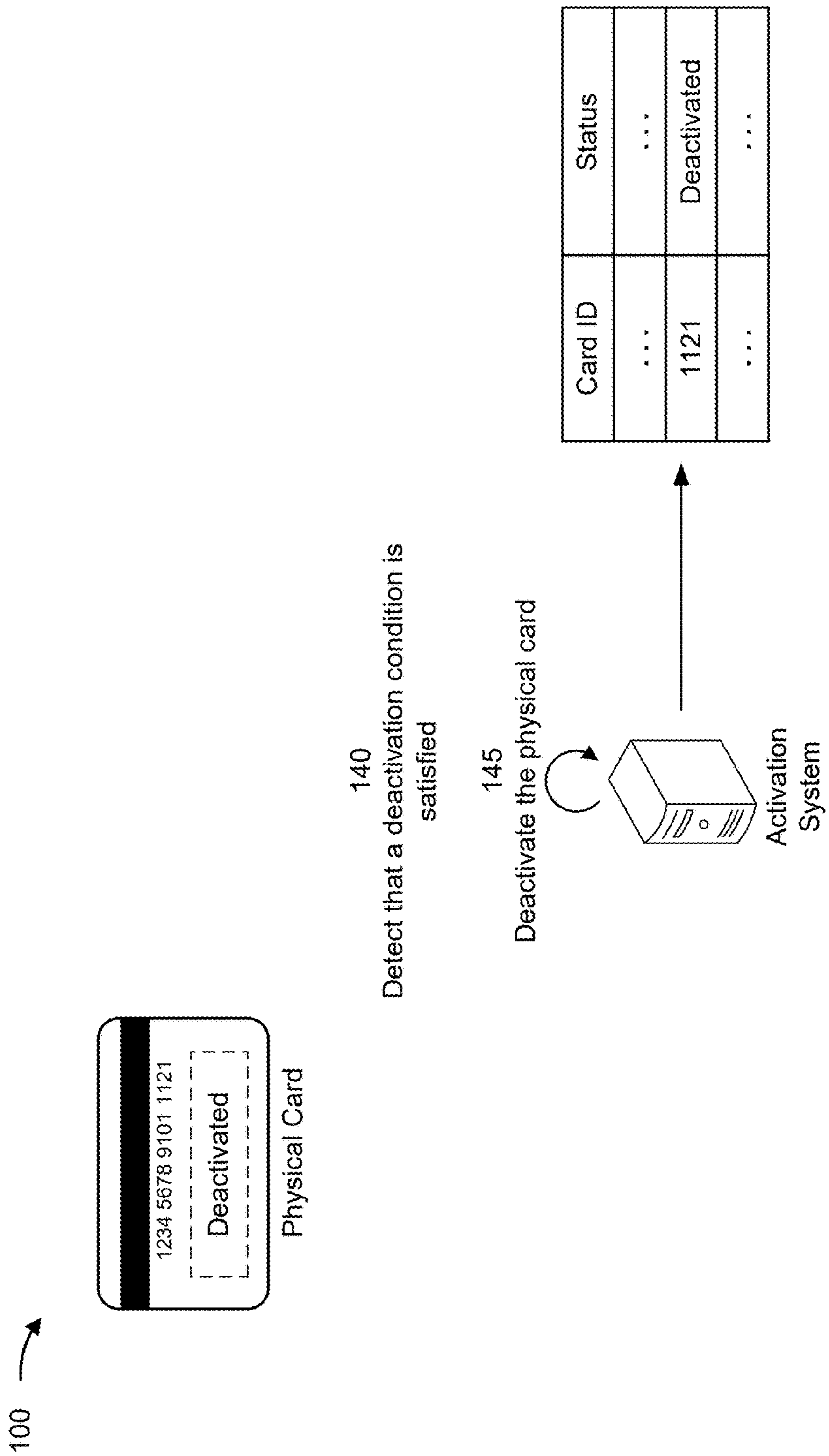

As shown in FIG. 1D, and by reference number 140, the activation system may detect that a deactivation condition for deactivating the physical card is satisfied. For example, once the physical card is activated, the deactivation condition can trigger automatic deactivation of the physical card. In some implementations, the deactivation condition may be the expiration of the activation time duration. For example, to detect that the deactivation condition is satisfied, the activation system may detect the expiration of the activation time duration (e.g., based on monitoring for the expiration of the activation time duration). In some implementations, the deactivation condition may be the occurrence of an exchange (e.g., a transaction) involving the physical card. For example, to detect that the deactivation condition is satisfied, the activation system may detect an exchange involving the physical card. In some implementations, the activation system may detect an exchange by processing the exchange (as described herein), by monitoring an exchange stream, by receiving an indication (e.g., a message) of the exchange, or the like. In some implementations, the deactivation condition may be the occurrence of a particular quantity of exchanges involving the transaction card (e.g., where the activation system has determined the quantity of exchanges with respect to the location type and/or the mobility level, as described above).

In some implementations, the deactivation condition may be whichever occurs first (or second) between the expiration of the activation time duration and the exchange involving the transaction card. For example, to detect that the deactivation condition is satisfied, the activation system may detect a first-in-time (or a second-in-time) of the expiration of the activation time duration or the exchange involving the transaction card. Accordingly, in some implementations, the physical card may be deactivated prior to the expiration of the activation time duration if an exchange involving the physical card occurs. Alternatively, in some implementations, the physical card may remain activated after the expiration of the activation time duration until an exchange involving the physical card occurs.

As shown by reference number 145, the activation system may deactivate the physical card in response to satisfaction of the deactivation condition. For example, deactivating the physical card may prevent use of the physical card in exchanges. In other words, while the physical card is deactivated, an attempt to use the physical card in an exchange will be declined. In one example, the activation system may deactivate the physical card in response to the expiration of the activation time duration. In another example, the activation system may deactivate the physical card in response to the exchange involving the physical card (e.g., prior to the expiration of the activation time duration). In a further example, the activation system may deactivate the physical card in response to the sum of the amounts associated with exchanges meeting the allowable amount. In some implementations, to deactivate the physical card, the activation system may update the status indicator for the physical card from the activated status to the default deactivated status. For example, the activation system may generate and execute a database query that updates (e.g., in a database) the status indicator for the physical card from the activated status to the default deactivated status.

The activation system may deactivate the physical card automatically in response to satisfaction of the deactivation condition. For example, the activation system may deactivate the physical card upon detecting the deactivation condition without involvement of the user device or the user (e.g., without an additional request to deactivate the physical card from the user device). By automatically deactivating the physical card, computing resources and network resources that otherwise may have been used for communicating an additional deactivation request between the user device and the activation system are conserved.

In some implementations, the activation system may transmit a notification to the user device indicating that the physical card has been deactivated. The notification may also indicate a reason for the deactivation, such as the expiration of the activation time duration or the occurrence of the exchange involving the physical card. The notification may also serve to facilitate detection of an undesired exchange.

Figure 1E:
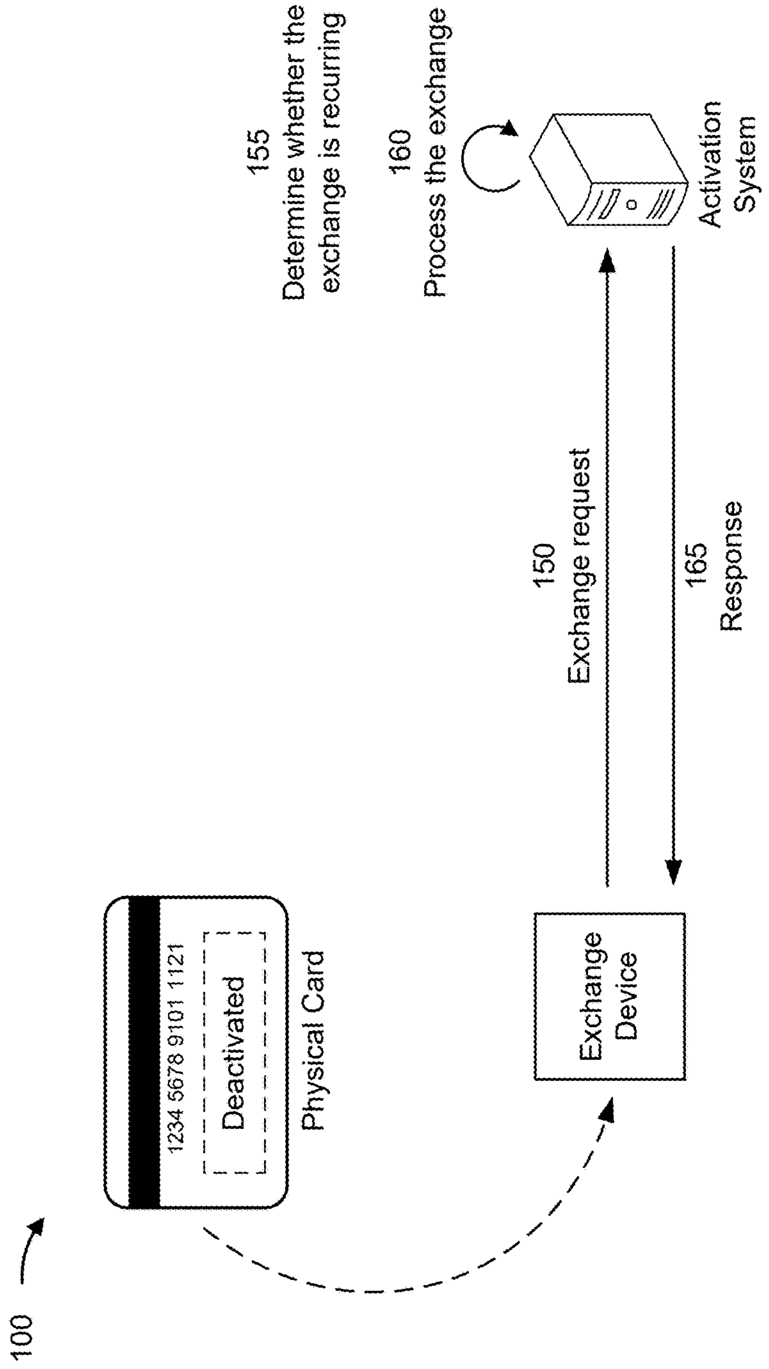

As shown in FIG. 1E, and by reference number 150, while the physical card is deactivated, the activation system may receive an exchange request from the exchange device, in a similar manner as described above. As shown by reference number 155, the activation system may determine whether the exchange is recurring. For example, the activation system may determine whether the exchange is recurring based on the historical exchange data for the physical card. As an example, the activation system may determine that the exchange is recurring if the historical exchange data indicates that the exchange is a periodic occurrence of one or more previous similar exchanges (e.g., having the same amount, the same merchant, the same category, the same day of the month, or the like, as the exchange). In some examples, the activation system may store a configurable whitelist indicating one or more channels associated with recurring exchanges. As shown by reference number 160, the activation system may process the exchange based on a determination that the exchange is recurring. For example, even when the physical card is deactivated, the activation system may process (e.g., approve) the exchange if the exchange is determined to be recurring, thereby conserving computing resources and/or network resources that otherwise may have been used to decline a valid exchange. Otherwise, if the exchange is determined to be non-recurring, the activation system may decline the exchange when the physical card is deactivated.

As shown by reference number 165, the activation system may transmit a response to the exchange request to the exchange device. The response may indicate that the exchange is approved or declined, as described above. Thus, deactivation of the physical card blocks undesired exchanges, thereby conserving computing resources and network resources that otherwise may have been expended processing undesired exchanges and/or reversing undesired exchanges.

As indicated above, FIGS. 1A-1E are provided as an example. Other examples may differ from what is described with regard to FIGS. 1A-1E.

Figure 2:
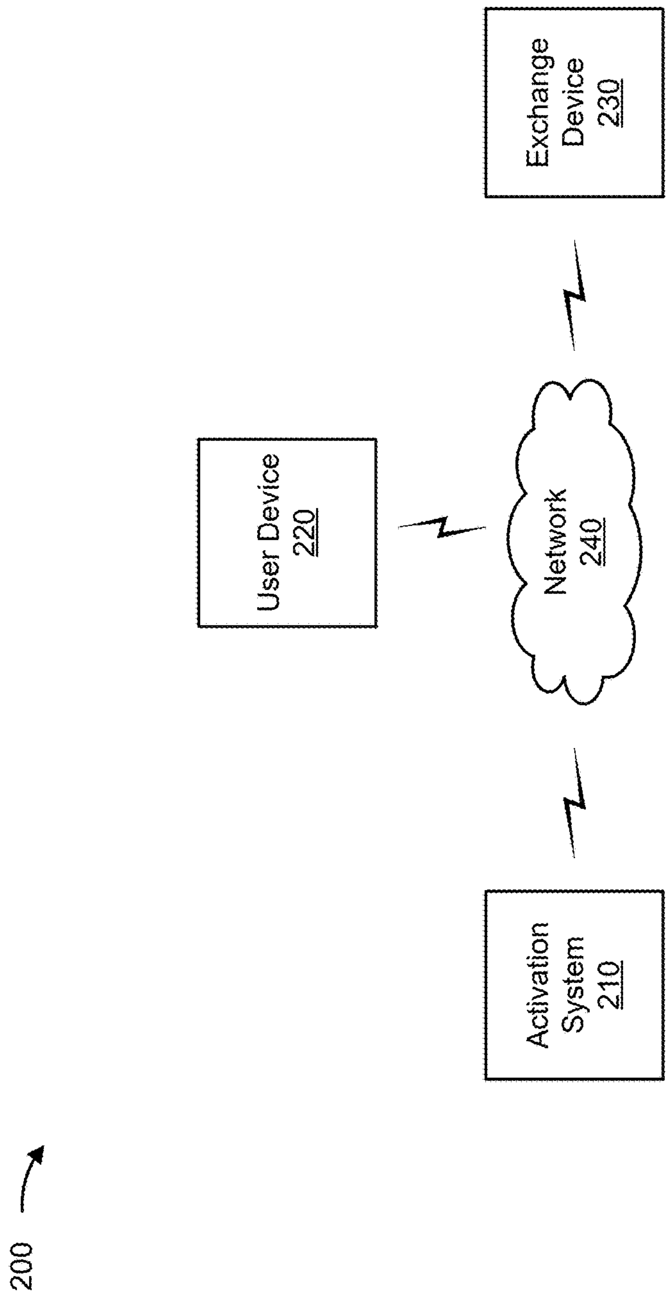
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an activation system 210, a user device 220, an exchange device 230, and a network 240. Devices of environment 200 may interconnect via wired connections, wireless connections, or a combination of wired and wireless connections.

The activation system 210 may include one or more devices capable of receiving, generating, storing, processing, providing, and/or routing information associated with selective unlocking of a physical card, as described elsewhere herein. The activation system 210 may include a communication device and/or a computing device. For example, the activation system 210 may include a server, such as an application server, a client server, a web server, a database server, a host server, a proxy server, a virtual server (e.g., executing on computing hardware), or a server in a cloud computing system. In some implementations, the activation system 210 may include computing hardware used in a cloud computing environment. In some implementations, the activation system 210 may include one or more servers and/or computing hardware (e.g., in a cloud computing environment or separate from a cloud computing environment) configured to receive and/or store information associated with processing an electronic exchange (e.g., a transaction). The activation system 210 may process an exchange, such as to approve (e.g., permit, authorize, or the like) or decline (e.g., reject, deny, or the like) the exchange and/or to complete the exchange if the exchange is approved.

The user device 220 may include one or more devices capable of receiving, generating, storing, processing, and/or providing information associated with selective unlocking of a physical card, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The exchange device 230 may include one or more devices capable of receiving, generating, storing, processing, providing, and/or routing information associated with an exchange involving a physical card, as described elsewhere herein. The exchange device 230 may include a communication device and/or a computing device. For example, the exchange device 230 may include a server, such as an application server, a client server, a web server, a database server, a host server, a proxy server, a virtual server (e.g., executing on computing hardware), or a server in a cloud computing system. In some implementations, the exchange device 230 may include computing hardware used in a cloud computing environment. Additionally, or alternatively, the exchange device 230 may include a transaction terminal, such as a point-of-sale device or an automated teller machine (ATM).

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
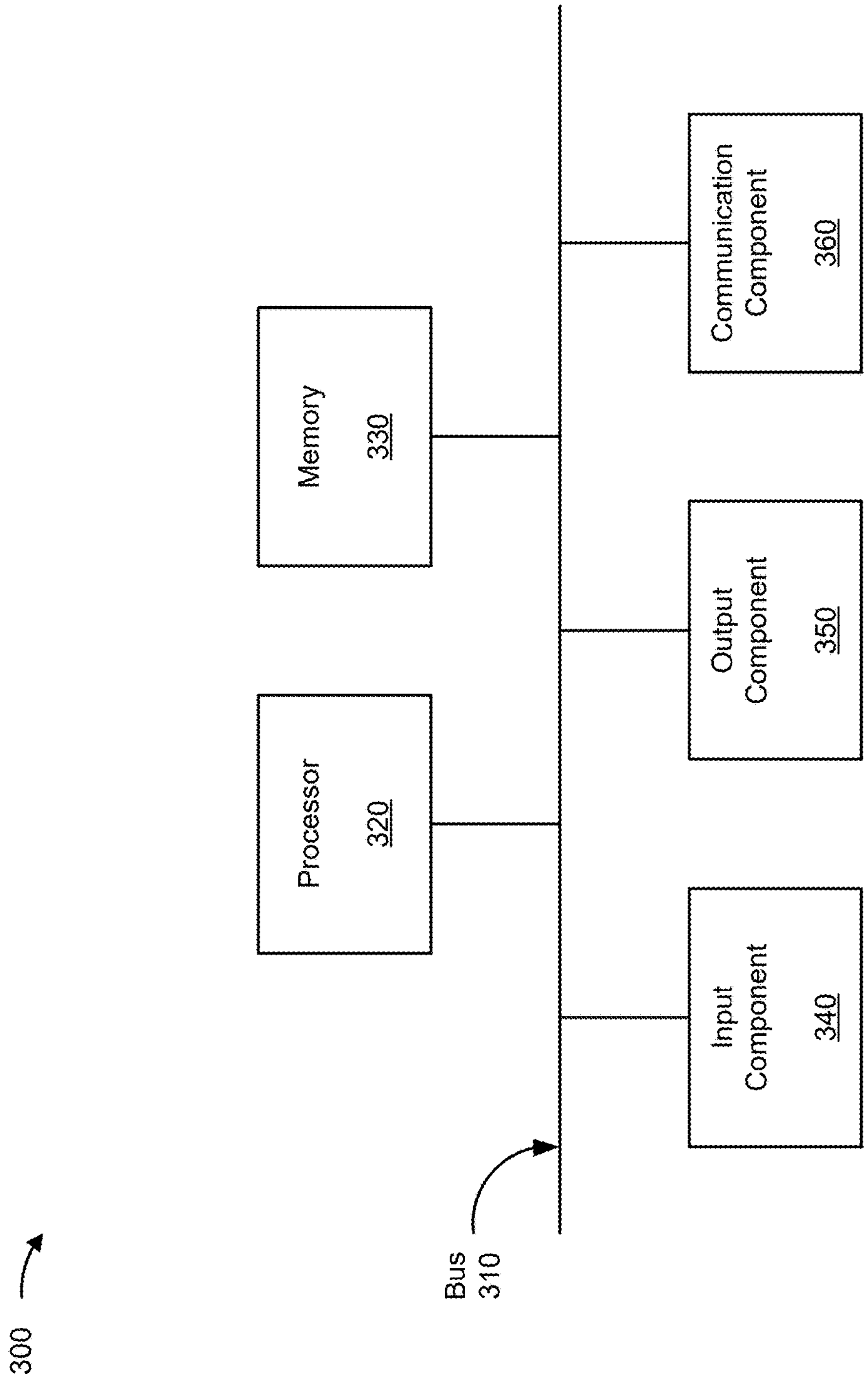
FIG. 3 is a diagram of example components of a device associated with selective unlocking of a physical card to restrict unauthorized access, in accordance with some embodiments of the present disclosure.

FIG. 3 is a diagram of example components of a device 300 associated with selective unlocking of a physical card to restrict unauthorized access. The device 300 may correspond to activation system 210, user device 220, and/or exchange device 230. In some implementations, activation system 210, user device 220, and/or exchange device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
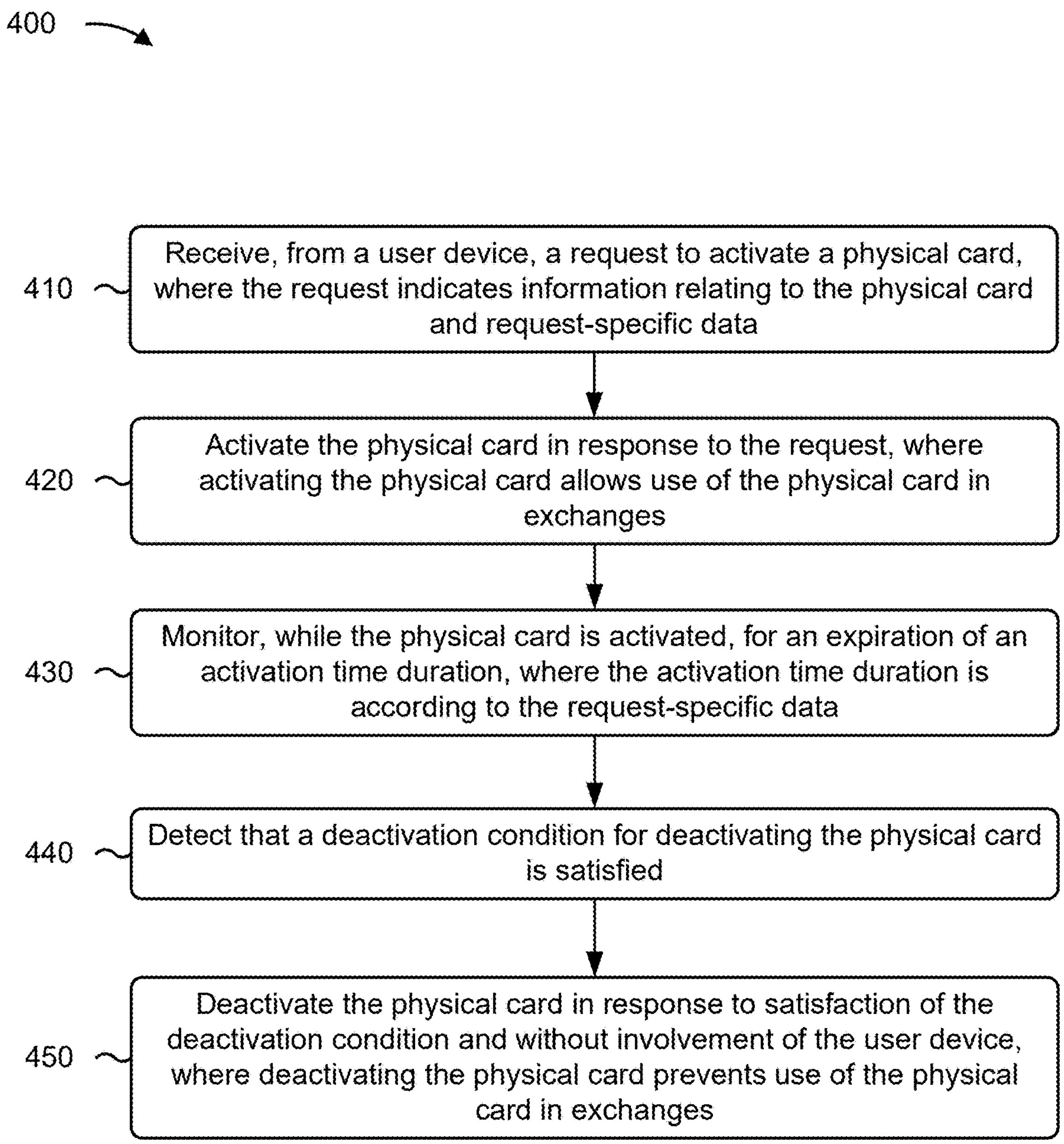
FIG. 4 is a flowchart of an example process associated with selective unlocking of a physical card, in accordance with some embodiments of the present disclosure.

FIG. 4 is a flowchart of an example process 400 associated with selective unlocking of a physical card. In some implementations, one or more process blocks of FIG. 4 may be performed by the activation system 210. In some implementations, one or more process blocks of FIG. 4 may be performed by another device or a group of devices separate from or including the activation system 210, such as the user device 220 and/or the exchange device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device, a request to activate a physical card, where the request indicates information relating to the physical card and request-specific data (block 410). For example, the activation system 210 (e.g., using processor 320, memory 330, input component 340, and/or communication component 360) may receive, from a user device, a request to activate a physical card, as described above in connection with reference number 105 of FIG. 1A. As an example, the request-specific data may indicate an activation time duration (e.g., an amount of time for which the physical card is to remain activated upon activation of the physical card) or may indicate location data associated with the user device.

As further shown in FIG. 4, process 400 may include activating the physical card in response to the request, where activating the physical card allows use of the physical card in exchanges (block 420). For example, the activation system 210 (e.g., using processor 320 and/or memory 330) may activate the physical card in response to the request, as described above in connection with reference number 115 of FIG. 1B. As an example, a status indicator for the physical card may be updated from a default deactivated status to an activated status.

As further shown in FIG. 4, process 400 may include monitoring, while the physical card is activated, for an expiration of an activation time duration, where the activation time duration is according to the request-specific data (block 430). For example, the activation system 210 (e.g., using processor 320 and/or memory 330) may monitor, while the physical card is activated, for an expiration of an activation time duration, as described above in connection with reference number 120 of FIG. 1B. As an example, the activation time duration may be indicated by the request-specific data or may be determined based on the location data associated with the user device.

As further shown in FIG. 4, process 400 may include detecting that a deactivation condition for deactivating the physical card is satisfied (block 440). For example, the activation system 210 (e.g., using processor 320, memory 330, input component 340, and/or communication component 360) may detect that a deactivation condition for deactivating the physical card is satisfied, as described above in connection with reference number 140 of FIG. 1D. As an example, the deactivation condition may be the expiration of the activation time duration or an occurrence of an exchange involving the physical card.

As further shown in FIG. 4, process 400 may include deactivating the physical card in response to satisfaction of the deactivation condition and without involvement of the user device, where deactivating the physical card prevents use of the physical card in exchanges (block 450). For example, the activation system 210 (e.g., using processor 320 and/or memory 330) may deactivate the physical card in response to satisfaction of the deactivation condition and without involvement of the user device, wherein deactivating the physical card prevents use of the physical card in exchanges, as described above in connection with reference number 145 of FIG. 1D. As an example, a status indicator for the physical card may be updated from an activated status to a default deactivated status.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The following provides an overview of some Aspects of the present disclosure:

Aspect 1: A system for selective unlocking of a physical card, the system comprising: one or more memories; and one or more processors, communicatively coupled to the one or more memories, configured to: receive, from a user device, a request to activate a physical card, wherein the request indicates location data associated with the user device; determine, based on the location data, an activation time duration for the physical card; activate the physical card in response to the request, wherein activating the physical card allows use of the physical card in exchanges; monitor, while the physical card is activated, for an expiration of the activation time duration; and deactivate, automatically in response to the expiration of the activation time duration, the physical card, wherein deactivating the physical card prevents use of the physical card in exchanges.

Aspect 2: The system of Aspect 1, wherein the one or more processors, to determine the activation time duration for the physical card, are configured to: determine, based on the location data, at least one of: a location type of a location of the user device, or a mobility level of the user device; and determine the activation time duration according to the at least one of the location type or the mobility level.

Aspect 3: The system of Aspect 2, wherein the one or more processors, to determine the activation time duration according to the at least one of the location type or the mobility level, are configured to: determine, based on historical exchange data for the physical card, the activation time duration according to the at least one of the location type or the mobility level.

Aspect 4: The system of any of Aspects 1-3, wherein the one or more processors are further configured to: receive, while the physical card is activated, an exchange request relating to an exchange involving the physical card; process the exchange in accordance with the physical card being activated; and deactivate the physical card in response to the exchange and prior to expiration of the activation time duration.

Aspect 5: The system of any of Aspects 1-4, wherein the one or more processors are further configured to: receive, while the physical card is deactivated, an exchange request relating to an exchange involving the physical card; determine, based on historical exchange data for the physical card, whether the exchange is recurring; and process the exchange based on a determination that the exchange is recurring.

Aspect 6: The system of any of Aspects 1-5, wherein the one or more processors, to deactivate the physical card, are configured to: deactivate the physical card without involvement of the user device.

Aspect 7: The system of any of Aspects 1-6, wherein the one or more processors, to activate the physical card, are configured to: update a status indicator for the physical card from a default deactivated status to an activated status.

Aspect 8: The system of any of Aspects 1-7, wherein the one or more processors, to deactivate the physical card, are configured to: update a status indicator for the physical card from an activated status to a default deactivated status.

Aspect 9: A method of selective unlocking of a physical card, comprising: receiving, by a device and from a user device, a request to activate a physical card, wherein the request indicates information relating to the physical card and request-specific data; activating, by the device, the physical card in response to the request, wherein activating the physical card allows use of the physical card in exchanges; monitoring, while the physical card is activated, for an expiration of an activation time duration, wherein the activation time duration is according to the request-specific data; and detecting, by the device, that a deactivation condition for deactivating the physical card is satisfied, wherein the deactivation condition is the expiration of the activation time duration or an occurrence of an exchange involving the physical card; and deactivating, by the device, the physical card in response to satisfaction of the deactivation condition and without involvement of the user device, wherein deactivating the physical card prevents use of the physical card in exchanges.

Aspect 10: The method of Aspect 9, wherein the request-specific data indicates the activation time duration.

Aspect 11: The method of any of Aspects 9-10, wherein the request-specific data indicates location data associated with the user device.

Aspect 12: The method of Aspect 11, further comprising: determining, based on the location data, the activation time duration for the physical card.

Aspect 13: The method of Aspect 12, further comprising: determining, based on the location data, at least one of: a location type of a location of the user device, or a mobility level of the user device; and determining the activation time duration according to the at least one of the location type of the mobility level.

Aspect 14: The method of any of Aspects 9-13, wherein the deactivation condition is a first-in-time of the expiration of the activation time duration or the occurrence of the exchange involving the physical card.

Aspect 15: The method of any of Aspects 9-14, wherein the request further indicates at least one of an allowable amount for the physical card or one or more allowable channels (e.g., allowable transaction types or allowable transaction parameters) for the physical card, and wherein the method further comprises: receiving, while the physical card is activated, an exchange request relating to the exchange involving the physical card, wherein the exchange request indicates an amount and a channel for the exchange; and transmitting a response indicating that the exchange is declined in accordance with at least one of: the amount, alone or in combination with amounts of one or more additional exchanges, exceeding the allowable amount, or the channel differing from the one or more allowable channels.

Aspect 16: A non-transitory computer-readable medium storing a set of instructions for selective unlocking of a physical card, the set of instructions comprising: one or more instructions that, when executed by one or more processors of a device, cause the device to: receive, from a user device, a request to activate a physical card, wherein the request indicates an activation time duration; activate the physical card in response to the request, wherein activating the physical card allows use of the physical card in exchanges; monitor, while the physical card is activated, for an expiration of the activation time duration; and deactivate, automatically in response to the expiration of the activation time duration, the physical card, wherein deactivating the physical card prevents use of the physical card in exchanges.

Aspect 17: The non-transitory computer-readable medium of Aspect 16, wherein the request further indicates one or more allowable channels for the physical card, and wherein the one or more instructions, when executed by the one or more processors, further cause the device to: receive, while the physical card is activated, an exchange request relating to an exchange involving the physical card, wherein the exchange request indicates a channel for the exchange; and transmit a response indicating that the exchange is declined in accordance with the channel differing from the one or more allowable channels.

Aspect 18: The non-transitory computer-readable medium of any of Aspects 16-17, wherein the one or more instructions, when executed by the one or more processors, further cause the device to: receive, while the physical card is deactivated, an exchange request relating to an exchange involving the physical card; determine, based on historical exchange data for the physical card, whether the exchange is recurring; and process the exchange based on a determination that the exchange is recurring.

Aspect 19: The non-transitory computer-readable medium of any of Aspects 16-18, wherein the one or more instructions, when executed by the one or more processors, further cause the device to: receive, while the physical card is activated, an exchange request relating to an exchange involving the physical card; process the exchange in accordance with the physical card being activated; and deactivate the physical card in response to the exchange and prior to expiration of the activation time duration.

Aspect 20: The non-transitory computer-readable medium of any of Aspects 16-19, wherein the one or more instructions, that cause the device to deactivate the physical card, cause the device to: deactivate the physical card without involvement of the user device.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for selective unlocking of a physical card, the system comprising:

one or more memories; and one or more processors, communicatively coupled to the one or more memories, configured to:

receive, from a user device and via an application on the user device, a request to activate a physical card, wherein the request indicates location data associated with the user device, wherein the application implements a single interaction user interface element for the request to activate the physical card, wherein the single interaction user interface element is a streamlined user interface that enables initiating the request with a single interaction comprising of at least one of one touch or one tap, and wherein the application blocks access to the user interface element when a user of the user device is not authenticated;

determine, based on the location data and based on an interaction with the single interaction user interface element, an activation time duration for the physical card, wherein the activation time duration is determined based on at least one of a location type or a mobility level associated with the user device, wherein the mobility level indicates a frequency of movement of the user device, wherein the at least one of the location type or the mobility level is associated with a parameter that indicates a time period between the request and performing a transaction, and wherein determining the activation time duration comprises identifying, based on historical transaction data, a timing relationship between an activation request and subsequent transactions related to at least one of the location type or the mobility level;

activate the physical card in response to the request that is based on the interaction with the single interaction user interface element, enabling use of the physical card in transactions, based on performing a database query that updates a status indicator for the physical card to indicate an activated status;

generate and execute a database query that updates a status indicator for the physical card;

monitor, while the physical card is activated, for an expiration of the activation time duration;

deactivate, automatically in response to the expiration of the activation time duration, the physical card; and prevent, based on the deactivation, use of the physical card in a transaction, based on updating the status indicator for the physical card to indicate a deactivated status.

2. The system of claim 1, wherein the one or more processors, to determine the activation time duration according to the at least one of the location type or the mobility level, are configured to:

determine, based on historical exchange data for the physical card, the activation time duration according to the at least one of the location type or the mobility level.

3. The system of claim 1, wherein the one or more processors are further configured to:

receive, while the physical card is activated, an exchange request relating to an exchange involving the physical card;

process the exchange in accordance with the physical card being activated; and deactivate the physical card in response to the exchange and prior to expiration of the activation time duration.

4. The system of claim 1, wherein the one or more processors are further configured to:

receive, while the physical card is deactivated, an exchange request relating to an exchange involving the physical card;

determine, based on historical exchange data for the physical card, whether the exchange is recurring; and process the exchange based on a determination that the exchange is recurring.

5. The system of claim 1, wherein the one or more processors, to deactivate the physical card, are configured to:

deactivate the physical card without involvement of the user device.

6. The system of claim 1, wherein the one or more processors, to activate the physical card, are configured to:

update a status indicator for the physical card from a default deactivated status to an activated status.

7. The system of claim 1, wherein the one or more processors, to deactivate the physical card, are configured to:

update a status indicator for the physical card from an activated status to a default deactivated status.

8. A method of selective unlocking of a physical card, comprising:

receiving, by a device, from a user device, and via an application on the user device, a request to activate a physical card, wherein the request indicates information relating to the physical card and location data, wherein the application implements a single interaction user interface element for the request to activate the physical card, wherein the single interaction user interface element is a streamlined user interface that enables initiating the request with a single interaction comprising at least one of one touch or one tap, and wherein the application blocks access to the user interface element when a user of the user device is not authenticated;

activating, by the device and based on an interaction with the single interaction user interface element, the physical card in response to the request, wherein activating the physical card allows use of the physical card in exchanges;

monitoring, while the physical card is activated, for an expiration of an activation time duration, wherein the activation time duration is determined according to at least one of a location type or a mobility level associated with the user device;

wherein the mobility level indicates a frequency of movement of the user device, wherein the at least one of the location type or the mobility level is associated with a parameter that indicates a time period between the request and performing a transaction, and wherein determining the activation time duration comprises identifying, based on historical transaction data, a timing relationship between an activation request and subsequent transactions related to at least one of the location type or the mobility level;

activating the physical card in response to the request that is based on the interaction with the single interaction user interface element, enabling use of the physical card in transactions, based on performing a database query that updates a status indicator for the physical card to indicate an activated status;

generating and executing a database query that updates a status indicator for the physical card;

detecting, by the device, that a deactivation condition for deactivating the physical card is satisfied, wherein the deactivation condition is the expiration of the activation time duration or an occurrence of an exchange involving the physical card;

deactivating, by the device, the physical card in response to satisfaction of the deactivation condition and without involvement of the user device; and preventing, based on the deactivation, use of the physical card in transaction, based on updating the status indicator for the physical card to indicate a deactivated status.

9. The method of claim 8, wherein the deactivation condition is a first-in-time of the expiration of the activation time duration or the occurrence of the exchange involving the physical card.

10. The method of claim 8, wherein the request further indicates at least one of an allowable amount for the physical card or one or more allowable channels for the physical card, and wherein the method further comprises:

receiving, while the physical card is activated, an exchange request relating to the exchange involving the physical card, wherein the exchange request indicates an amount and a channel for the exchange; and transmitting a response indicating that the exchange is declined in accordance with at least one of:

the amount, alone or in combination with amounts of one or more additional exchanges, exceeding the allowable amount, or the channel differing from the one or more allowable channels.

11. A non-transitory computer-readable medium storing a set of instructions for selective unlocking of a physical card, the set of instructions comprising:

one or more instructions that, when executed by one or more processors of a device, cause the device to:

receive, from a user device and via an application on the user device, a request to activate a physical card, wherein the request indicates location data associated with the user device, wherein the application implements a single interaction user interface element for the request to activate the physical card, wherein the single interaction user interface element is a streamlined user interface that enables initiating the request with a single interaction comprising of at least one of one touch or one tap, and wherein the application blocks access to the user interface element when a user of the user device is not authenticated;

activate the physical card in response to the request;

monitor, while the physical card is activated, for an expiration of an activation time duration, wherein the activation time duration is determined based on an interaction with the single interaction user interface element and based on at least one of a location type or a mobility level associated with the user device, wherein the mobility level indicates a frequency of movement of the user device, wherein the at least one of the location type or the mobility level is associated with a parameter that indicates a time period between the request and performing a transaction, and wherein determining the activation time duration comprises identifying, based on historical transaction data, a timing relationship between an activation request and subsequent transactions related to at least one of the location type or the mobility level;

generate and execute a database query that updates a status indicator for the physical card;

activate the physical card in response to the request that is based on the interaction with the single interaction user interface element, enabling use of the physical card in transactions, based on performing a database query that updates a status indicator for the physical card to indicate an activated status;

deactivate, automatically in response to the expiration of the activation time duration, the physical card; and prevent, based on the deactivation, use of the physical card in transaction, based on updating the status indicator for the physical card to indicate a deactivated status.

12. The non-transitory computer-readable medium of claim 11, wherein the request further indicates one or more allowable channels for the physical card, and wherein the one or more instructions, when executed by the one or more processors, further cause the device to:

receive, while the physical card is activated, an exchange request relating to an exchange involving the physical card, wherein the exchange request indicates a channel for the exchange; and transmit a response indicating that the exchange is declined in accordance with the channel differing from the one or more allowable channels.

13. The non-transitory computer-readable medium of claim 11, wherein the one or more instructions, when executed by the one or more processors, further cause the device to:

receive, while the physical card is deactivated, an exchange request relating to an exchange involving the physical card;

determine, based on historical exchange data for the physical card, whether the exchange is recurring; and process the exchange based on a determination that the exchange is recurring.

14. The non-transitory computer-readable medium of claim 11, wherein the one or more instructions, when executed by the one or more processors, further cause the device to:

receive, while the physical card is activated, an exchange request relating to an exchange involving the physical card;

process the exchange in accordance with the physical card being activated; and deactivate the physical card in response to the exchange and prior to expiration of the activation time duration.

15. The non-transitory computer-readable medium of claim 11, wherein the one or more instructions, that cause the device to deactivate the physical card, cause the device to:

deactivate the physical card without involvement of the user device.

16. The system of claim 1, wherein at least one of the location type or the mobility level indicate a probability of a particular exchange behavior.

17. The system of claim 1, wherein the mobility level is determined based on using a machine learning model trained to output a score associated with the mobility level based on historical exchange data.

18. The system of claim 1, wherein the physical card is deactivated further based on an occurrence of a transaction associated with exchanges involving the physical card.

19. The method of claim 8, wherein the physical card is deactivated further based on an occurrence of a transaction associated with exchanges involving the physical card.

20. The method of claim 8, wherein the mobility level is determined based on using a machine learning model trained to output a score associated with the mobility level based on historical exchange data.

* * * * *